(12) United States Patent
Hadj-Rabah et al.

(10) Patent No.: US 10,634,577 B2
(45) Date of Patent: *Apr. 28, 2020

(54) LEAK DETECTION MODULE AND METHOD FOR CHECKING THE SEAL-TIGHTNESS OF AN OBJECT TO BE TESTED BY TRACER GAS

(71) Applicant: PFEIFFER VACUUM, Annecy (FR)

(72) Inventors: Smail Hadj-Rabah, Annecy (FR); Ghislain Jacquot, Moye (FR); Mathieu Schreiner, Duingt (FR); Laurent Ducimetiere, Servier (FR); Cyrille Nomine, Epagny (FR); Pascal Jourdan, Poisy (FR)

(73) Assignee: PFEIFFER VACUUM, Annecy (FR)

( * ) Notice: Subject to any disclaimer, the term of this patent is extended or adjusted under 35 U.S.C. 154(b) by 63 days.

This patent is subject to a terminal disclaimer.

(21) Appl. No.: 16/164,959

(22) Filed: Oct. 19, 2018

(65) Prior Publication Data

US 2019/0128765 A1    May 2, 2019

(30) Foreign Application Priority Data

Oct. 27, 2017  (FR) .................................. 17 60170

(51) Int. Cl.
*G01M 3/04* (2006.01)
*G01M 3/20* (2006.01)
(Continued)

(52) U.S. Cl.
CPC .............. *G01M 3/223* (2013.01); *G01M 3/20* (2013.01); *G02B 27/0172* (2013.01);
(Continued)

(58) Field of Classification Search
CPC .................................................... G06T 19/006
See application file for complete search history.

(56) References Cited

U.S. PATENT DOCUMENTS

| 7,657,384 B1 | 2/2010 | Moses | |
| 2008/0295579 A1* | 12/2008 | Safai | G01M 3/363 |
| | | | 73/40 |

(Continued)

FOREIGN PATENT DOCUMENTS

| EP | 2 169 444 A1 | 3/2010 |
| WO | WO 2014/032353 A1 | 3/2014 |

OTHER PUBLICATIONS

French Search Report dated Jun. 22, 2018 in French Patent Application No. 1760170 (with English translation of Category of Cited Documents), 8 pages.

*Primary Examiner* — Herbert K Roberts
(74) *Attorney, Agent, or Firm* — Oblon, McClelland, Maier & Neustadt, L.L.P.

(57) ABSTRACT

A leak detection module for checking the seal-tightness of an object to be tested by tracer gas is provided, including a leak detector and a probe configured to be manipulated by a user; and a vision device including a processing and display unit configured to communicate with the leak detector, a securing means configured to secure the vision device on a head of the user, and a viewing surface fixed to the securing means and configured to be placed in a field of view of the user, the processing and display unit being further configured to display, on the viewing surface, information relating to detection of leaks including at least one signal representative of a concentration of tracer gas measured by the leak detector. A method for checking the seal-tightness of an object to be tested by tracer gas is also provided.

17 Claims, 3 Drawing Sheets

(51) Int. Cl.
*G01M 3/22* (2006.01)
*G02B 27/01* (2006.01)
*G06K 9/00* (2006.01)
*G06T 19/00* (2011.01)
*G06T 11/20* (2006.01)

(52) U.S. Cl.
CPC ........ *G06K 9/00671* (2013.01); *G06T 19/006* (2013.01); *G01M 3/04* (2013.01); *G02B 2027/014* (2013.01); *G02B 2027/0138* (2013.01); *G02B 2027/0141* (2013.01); *G06T 11/206* (2013.01)

(56) References Cited

U.S. PATENT DOCUMENTS

| | | | |
|---|---|---|---|
| 2010/0073262 A1 | 3/2010 | Matsumoto | |
| 2018/0328808 A1* | 11/2018 | Jourdan | G01M 3/20 |
| 2019/0003984 A1* | 1/2019 | Kester | G01J 3/28 |
| 2019/0250060 A1* | 8/2019 | Kawai | H04N 5/2251 |
| 2019/0339154 A1* | 11/2019 | Jourdan | G01M 3/20 |
| 2019/0339158 A1* | 11/2019 | Yanai | G01M 3/22 |

\* cited by examiner

LEAK DETECTION MODULE AND METHOD FOR CHECKING THE SEAL-TIGHTNESS OF AN OBJECT TO BE TESTED BY TRACER GAS

The present invention relates to a leak detection module for checking the seal-tightness of an object to be tested by tracer gas and a method for checking the seal-tightness of an object to be tested by tracer gas.

The so-called tracer gas "sniffer" test and so-called "spraying" test are known for checking the seal-tightness of an object. These methods involve the detection of the passage of the tracer gas through any leaks of the object to be tested. In sniffer mode any presence of tracer gas around an object to be tested filled with generally pressurized tracer gas is sought using a leak detector linked to a sniffer probe. In spraying mode, a spray gun is used to spray the object to be tested with tracer gas, the internal volume of the object to be tested being linked to a leak detector.

The search for leaks is performed by moving the sniffer probe or the spray gun around the object to be tested, particularly in test zones likely to exhibit seal-tightness weaknesses, such as around seals. An increase in the measured tracer gas concentration reveals the presence of a leak at the point where the end-fitting of the probe is positioned. The operator must therefore monitor both the probe and the screen of the detector. This step is not easy because the screen is generally positioned away from the search zone, which requires the operator to often turn the head between the detector and the probe.

That can be detrimental to the detection quality because of the highly reactive nature of the tracer gas. The operator can in fact risk missing a leak detection in the time that he or she diverts the eyes from the screen. One solution consists in displaying a trend over time of the measured signal. By viewing the history of the measurements, the operator can rapidly check whether a leak is revealed or not when he or she was not looking at the screen. One drawback is that the operator is not informed in real time of the presence of a leak and must repeat his or her search to locate the missed leak.

Moreover, turning the head repeatedly can make the seal-tightness check uncomfortable for the operator, particularly in production.

Furthermore, when the leak detector is relatively far away from the search zone and the operator uses a remote screen, the manipulation thereof requires a hand of the operator to be immobilized, which can prove uncomfortable and inconvenient.

Another solution consists in emitting a sound, of which at least one of the characteristics such as the amplitude, the tone or the pattern changes with the measured tracer gas concentration. This solution allows the operator to know when the probe is approaching a leak without having to watch the screen of the detector. Some of the information may however be lost because the discrimination of the sound variations by the operator is less accurate than the reading of numeric values.

Some probes include indicator lamps that change color with the tracer gas concentration level. However, as for the sound, the change of color can cause a loss of information.

Other probes are provided with dedicated screens, linked to the detectors, displaying the measurement of the tracer gas concentration. However, reading on the screen of the probe may not always be possible because the legibility depends on the orientation of the probe and the latter depends on the accessibility of the test zone.

One aim of the present invention is therefore to propose a leak detection module which at least partly resolves the abovementioned drawbacks, in particular by being more ergonomic and easier to manipulate.

To this end, the subject of the invention is a leak detection module for checking the seal-tightness of an object to be tested by tracer gas, comprising a leak detector and a probe that can be manipulated by the user, characterized in that it also comprises a vision device comprising:
- a processing and display unit configured to communicate with the leak detector,
- a securing means configured to secure the vision device on the head of a user, and
- a viewing surface fixed to the securing means to be placed in the field of view of the user, the processing and display unit being configured to display, on the viewing surface, information relating to the detection of leaks comprising at least one signal representative of the concentration of tracer gas measured by the leak detector.

The tracer gas concentration is therefore displayed in the field of view of the user regardless of where he or she is looking. The information displayed thus follows the gaze of the user even if the latter diverts the head from the screen of the detector.

According to one or more features of the leak detection module, taken alone or in combination:
- the vision device comprises at least one front-mounted camera configured to take images in the field of view of the user,
- the viewing surface comprises a screen configured to display images in a portion of the field of view of the user,
- the viewing surface is formed by a transparent surface allowing the user to see through, the processing and display unit being configured to display, in augmented reality on the viewing surface, at least one item of information relating to the detection of leaks,
- the processing and display unit comprises a recognition means configured to recognize a test zone of the object to be tested and to display, on the viewing surface, a visual marker of the at least one test zone,
- the recognition means is configured to recognize an end-fitting of the probe in the viewing surface and to detect when the end-fitting of the probe is situated in a test zone of the object to be tested,
- the probe is a sniffer probe linked to the leak detector,
- the probe is a spray gun intended to be linked to a tracer gas source.

Another subject of the invention is a method for checking the seal-tightness of an object to be tested by tracer gas, characterized in that a vision device of a leak detection module as described previously displays information relating to the detection of leaks comprising at least one signal representative of the concentration of tracer gas measured by the leak detector on a viewing surface placed in the field of view of the user by a vision device worn on the head of a user.

The signal can be displayed in the form of a numeric value, of bar graphs or in the form of a graph.

The information displayed can indicate whether the signal exceeds a maximum tracer gas concentration threshold.

The information displayed can comprise a signal representative of a state of operation of the leak detector, such as a state of alert or of measurement in progress, a fault, maintenance to be performed or a usage recommendation.

At least one predetermined test zone of the object to be tested can be recognized by a recognition means of the processing unit which indicates the test zone by displaying, in augmented reality, a visual marker on the viewing surface. The marker can be accompanied by the display of at least one maximum tracer gas concentration threshold associated with the predetermined test zone of the object to be tested.

The recognition means of the processing unit can detect when the end-fitting of the probe is situated in a test zone of the object to be tested.

The test zones which have been tested by the probe can be indicated.

The measured tracer gas concentration values associated with the test zones can be saved. The sequence of measurement operations performed by the user on the object to be tested can be filmed. One or more photos of the probe positioned in test zones of the object to be tested can be taken.

Other features and advantages of the invention will emerge from the following description, given by way of example and in a nonlimiting manner, in light of the attached drawings in which.

In these figures, the elements that are identical bear the same reference numbers. The following embodiments are examples. Although the description refers to one or more embodiments, this does not necessarily mean that each reference relates to the same embodiment, or that the features apply only to a single embodiment. Single features of different embodiments can also be combined to provide other embodiments.

An "object to be tested" is defined as an object or an installation whose seal-tightness is to be checked.

Figure 1:
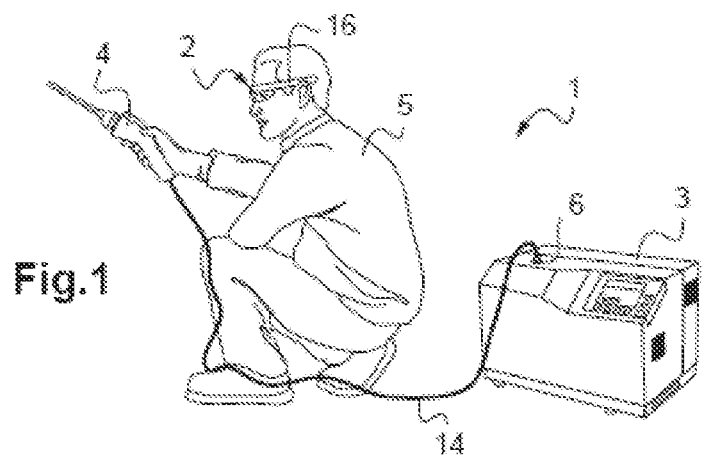
FIG. 1 shows a schematic view of a user wearing a vision device and manipulating a sniffer probe linked to a leak detector.

FIG. 1 shows an example of a leak detection module 1 for checking the seal-tightness of an object to be tested by tracer gas used by a user 5.

The leak detection module 1 comprises a vision device 2, a leak detector 3 and a probe 4.

Figure 2:
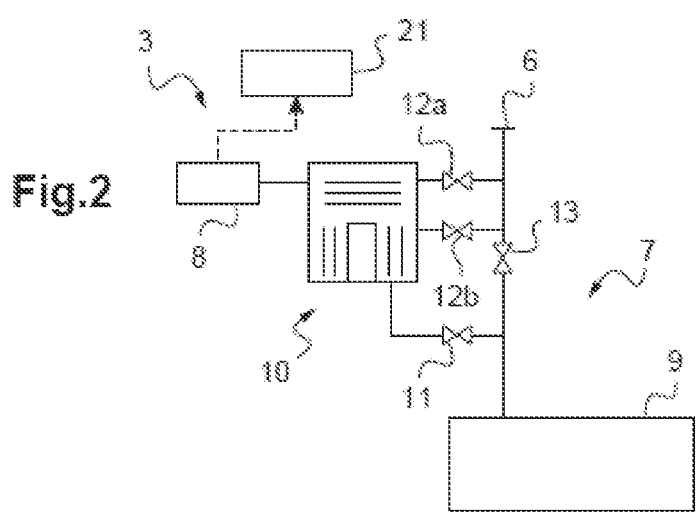
FIG. 2 shows a schematic view of an example of a leak detector.

The leak detector 3 comprises, for example and as represented in FIG. 2, a detection input 6, a pumping device 7 and a gas detector 8.

The pumping device 7 comprises, for example, at least one primary vacuum pump 9, such as a membrane pump, and at least one turbomolecular vacuum pump 10.

The gas detector 8 is connected to the turbomolecular vacuum pump 10, for example to its suction side. The gas detector 8 comprises, for example, a mass spectrometer. The gas detector 8 makes it possible in particular to determine a concentration of tracer gas in the gases taken in at the detection input 6.

The discharge side of the turbomolecular vacuum pump 10 is connected to the input of the primary vacuum pump 9 via a first isolation valve 11.

The detection input 6 of the leak detector 3 is for example coupled to an intermediate stage of the turbomolecular vacuum pump 10, via at least one sampling valve 12a, 12b. The pumping device 7 comprises for example at least two sampling valves 12a, 12b, each value 12a, 12b being coupled to a distinct intermediate stage of the turbomolecular vacuum pump 10 so as to be able to adapt the sampling flow to the level of the leak rate, the sampling valve 12a, 12b being coupled to a bypass of a duct of the vacuum line arranged between the detection input 6 and a second isolation valve 13. The second isolation valve 13 is coupled to the vacuum line between the first isolation valve 11 and the input of the primary vacuum pump 9.

The probe 4 has at least one gripping means allowing it to be able to be manipulated by the user 5.

In the first exemplary embodiment illustrated in FIG. 1, the probe 4 is a sniffer probe.

The sniffer probe is linked to the detection input 6 of the leak detector 3 by a flexible pipe 14 so as to suck in the gases surrounding the object to be tested filled with tracer gas. A portion of the gases sucked in by the pumping device 7 is analyzed by the gas detector 8 which provides a tracer gas concentration to a control unit 21 of the detector 3. A maximum tracer gas threshold that is exceeded reveals a leak. Helium or hydrogen is generally used as tracer gas because these gases pass through the small leaks more easily than the other gases, because of the small size of their molecules and their high rate of displacement.

The vision device 2 is worn by the head of the user 5.

Figure 3:
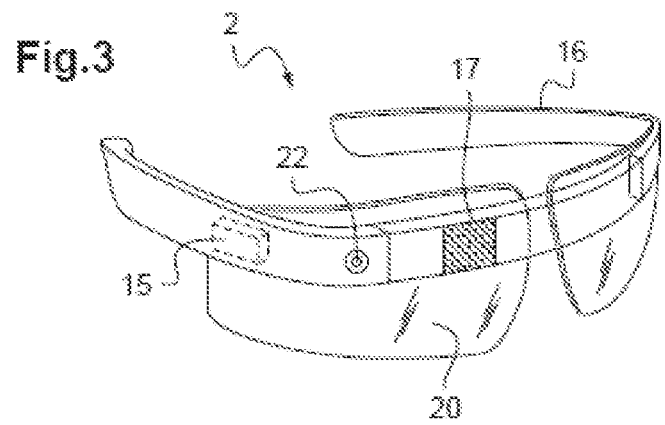
FIG. 3 shows a schematic view of a first example of vision device.

As can be better seen in FIG. 3, the vision device 2 comprises a processing and display unit 15, a securing means 16 and a viewing surface 17 (FIG. 3).

The securing means 16 is configured to secure the vision device 2 on the head of the user 5. It comprises, for example, a mount intended to rest on the nose of the user and to bear on his or her ears, like a spectacle frame, or comprises an adjustable hoop around the head of the user 5 or a headset or a headband-forming support.

The viewing surface 17 is fixed to the securing means 16 to be able to be placed in the field of view of the user 5.

According to an exemplary embodiment, the viewing surface 17 comprises a screen configured to display images in a portion of the field of view of the user. The vision device 2 can also comprise a protective transparent surface 20, made of glass or of plastic, situated between the eyes of the user 5 and the screen, forming spectacles.

The processing and display unit 15 comprises one or more controllers or processors configured in particular to communicate with a leak detector 3. It comprises, for example, wireless communication means, such as WIFI or Bluetooth, configured to communicate wirelessly with complementary communication means of the control unit 21 of the leak detector 3. The processing and display unit 15 can thus therefore access information relating to the detection of leaks. The processing and display unit 15 is for example borne by the securing means 16, such as by a branch of the securing means 16.

The processing and display unit 15 is also configured to display, on the viewing surface 17, information 18 relating to the detection of leaks.

Figure 4:
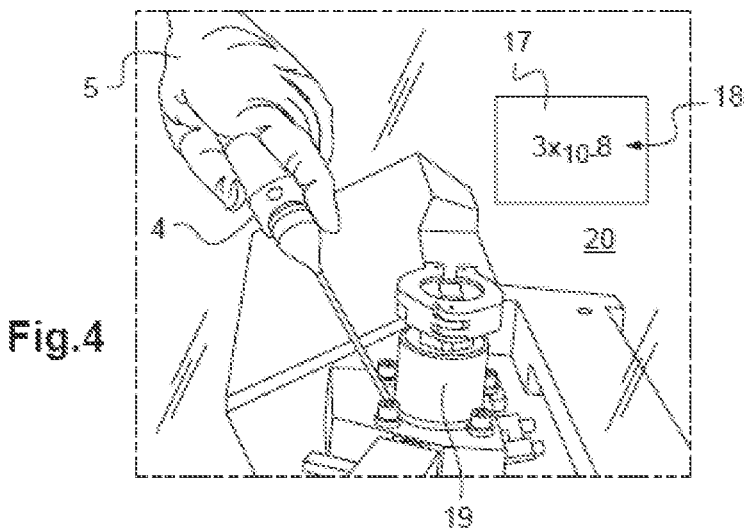
FIG. 4 shows a schematic view of an example of what can be seen by the user wearing the vision device of FIG. 3 during a search for leaks.

The information 18 comprises at least one signal representative of the tracer gas concentration measured by the leak detector 3 (FIG. 4). The tracer gas concentration is therefore displayed in the field of view of the user 5 regardless of where he or she is looking. The information 18 displayed thus follows the gaze of the user 5 even if the latter diverts the head from the screen of the detector 3.

The signal can be displayed in different ways depending on the wishes of the user 5. The signal is for example displayed in the form of a numeric value (FIG. 4), of bar graphs (intensity bar graphs) or of a graph.

The information 18 displayed can indicate whether the signal exceeds a maximum tracer gas concentration threshold, for example using a color code. The signal can thus change color when the tracer gas concentration crosses a detection threshold. It is for example displayed in green when the measurement is below the threshold and in red when the measurement crosses the threshold.

The information 18 can comprise a signal representative of a state of operation of the leak detector 3, such as a state of alert or of measurement in progress, a fault, maintenance to be carried out or a usage recommendation. The information 18 on the state of operation of the leak detector 3 for example allows the user who cannot directly view the leak detector 3 to check that it is indeed carrying out a measurement to conclude on the absence of leaks in the presence of a low or nil measurement signal.

The information 18 can also be displayed additionally on a computer or tablet screen or can be displayed directly on the object to be tested 19 via a projector.

According to an exemplary embodiment, the vision device 2 comprises at least one front-mounted camera 22 configured to take images in the field of view of the user 5. It is thus possible to film the sequence of measurement operations performed by the user 5 on the object to be tested 19 or to take one or more photos of the test carried out, for example, to associate it with a file of the tracer gas concentration measurements. A certificate of seal-tightness associated with the object to be tested 19 can thus be supplied to a client or to a quality department, this certificate proving, on the one hand, that the test zones have indeed been tested by the user 5 and, on the other hand, that the level of seal-tightness is below the rejection threshold.

There now follows a description of an example of operation of the leak detection module 1 and of the associated method for checking the seal-tightness of an object to be tested 19 by tracer gas.

The object to be tested 19 is previously filled with tracer gas, for example pressurized.

The user 5 places the vision device 2 on his or her head to see the viewing surface 17 in his or her field of view.

The user offers up the sniffer probe 4 to a test zone.

The probe 4 linked to the leak detector 3 sucks in the gases surrounding the object to be tested 19 in the test zone. A portion of the gases thus taken off, possibly containing the tracer gas revealing a leak, is then analyzed by the gas analyzer 8 which supplies a measurement of the tracer gas concentration to the control unit 21 of the leak detector 3. The control unit 21 sends this information, processed or not, to the processing and display unit 15. The processing and display unit 15 displays this information 18 for example in the form of a numeric value on the viewing surface 17 (FIG. 4).

The tracer gas concentration measurement information 18 is thus displayed in real time in the field of view of the user 5. The user 5 thus has access to the measurement without needing to divert the gaze from the test zone and without having to hold a remote screen.

The measured tracer gas concentration values and the associated sequence of measurement operations performed by the user 5 can be saved. The sequence of measurement operations performed by the user 5 on the object to be tested 19 can be filmed by the front-mounted camera 22 or the front-mounted camera 22 can take one or more photos of the test performed on the object to be tested 19, in particular of the probe 4 positioned in the test zones. These results can be associated with serial numbers of the objects to be tested 19, which is particularly useful in production. That makes it possible to centralize all the results and allows the user to return subsequently to a test that has been carried out.

Figure 5:
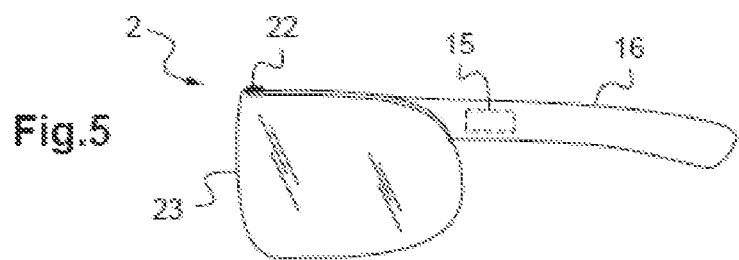
FIG. 5 shows another exemplary embodiment of a vision device.

FIG. 5 illustrates a second exemplary embodiment of the vision device 2.

This second embodiment differs from the preceding one by the fact that the processing and display unit 15 is configured to display, in augmented reality, at least one item of information 24 relating to the detection of leaks on the viewing surface 23. The augmented reality allows the user to see the information 24 relating to the detection of leaks, superimposed on reality.

The viewing surface 23 is formed by a transparent surface allowing the user to see through, such as a glass or plastic surface.

Figure 6:
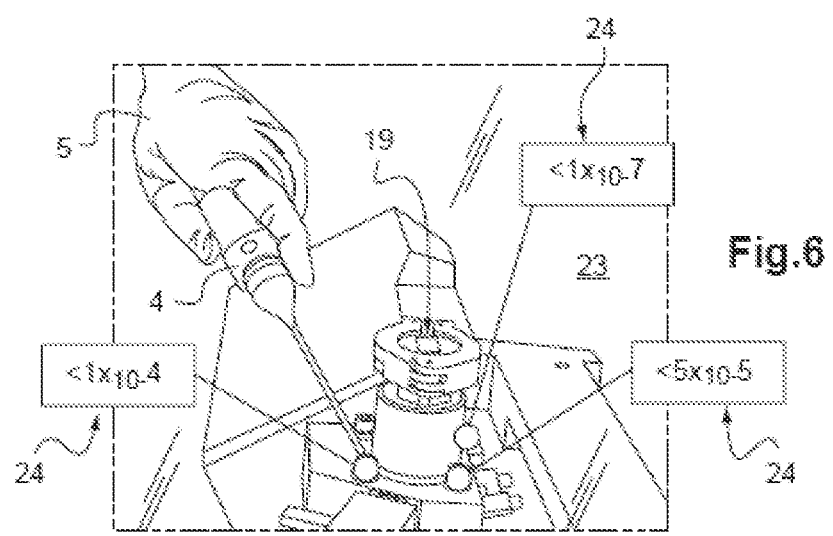
FIG. 6 shows another example of what can be seen by the user wearing the vision device of FIG. 5.

The processing and display unit 15 can also comprise a recognition means configured to recognize at least one test zone of an object to be tested 19 and to display, on the viewing surface 23, an item of information 24 comprising a visual marker of the at least one test zone (FIG. 6).

The visual marker of the test zone can be a marking of a surface of the object to be tested or a path to be followed by the probe 4.

For that, for example, a 3D spatial representation of the object to be tested is stored, for example in the form of a file, together with at least one reference marker associated with the object to be tested.

The reference marker makes it possible to associate the object to be tested with the information to be displayed on the viewing surface 23. It is for example a barcode or a photograph of the object to be tested. In the case of a reference marker of barcode type, a same reference marker is deposited on the object to be tested.

The recognition means is for example configured to carry out image processing, in particular to compare the images taken by the front-mounted camera 22 of the vision device 2 worn by the user 5 looking at the object to be tested with the stored spatial representation of the object to be tested. The processing unit 15 searches for the reference marker in the images taken by the front-mounted camera 22. In the case of a reference marker of barcode type, once the reference marker is recognized, the spatial representation to be matched with the images is selected. In the case of a reference marker of photo type, the object to be tested is directly recognized in the images taken by the front-mounted camera 22 and there is a search to match the spatial representation with the images.

This calibration step allows the information displayed in augmented reality to "follow" the object to be tested seen through the viewing surface 23.

According to another example, provision can be made for the object to be tested 19 to be disposed by the user 5 in a known spatial marker in such a way that the recognition means can identify the test zone of the object to be tested in the viewing surface 23 with a less intensive image processing.

Three predetermined test zones of the object to be tested 19 are thus indicated by a respective visual marker in the information 24 displayed in augmented reality in the example of FIG. 6.

In addition to the visual marker, the information 24 can comprise at least one maximum tracer gas concentration threshold associated with the test zone. The threshold can be different according to the test zone (FIG. 6).

The recognition means of the processing and display unit 15 can also be configured to recognize an end-fitting of the probe 4 in the viewing surface 23 and to detect when the end-fitting of the probe 4 is situated in a test zone of the object to be tested 19. As previously, the recognition means can identify the end-fitting of the probe 4 by image processing. The end-fitting of the probe 4 can have a marker or a color allowing it to be easily identifiable by the recognition means of the processing and display unit 15.

The processing and display unit 15 can for example be configured to inhibit a measurement as long as the end-fitting of the probe 4 is not detected in the test zone or can inform the user, for example by a sound signal, when the probe 4 is detected in the test zone. That can make it possible to avoid any incorrect conclusions of seal-tightness tests associated with poor positionings of the probe 4.

The information 24 displayed on the viewing surface 23 can indicate the test zones which have been tested by the probe 4, for example using a color code and for example by leaving a signal representative of the tracer gas concentration displayed in augmented reality in the test zones which have been tested.

It is thus possible for the user 5 to quickly see where the test zones are, what the associated maximum thresholds are, what zones have already been tested and those which are still to be tested, as well as a general state of the leak rate of the object to be tested 19. The quality of the check is improved by reducing the risks of test zones being forgotten and the duration of the test is reduced by avoiding the user wasting time in locating the test zones.

The measured tracer gas concentration values can be saved.

The front-mounted camera 22 can also film the sequence of measurement operations performed by the user 5 on the object to be tested, showing the circuit followed by the probe 4, or take one or more photos of the probe 4 positioned in test zones of the object to be tested 19.

In operation, according to an exemplary implementation:

The object to be tested 19 is previously filled with tracer gas. The user 5 places the vision device 2 on his or her head to see in front of him or her through the viewing surface 23 positioned in his or her field of view.

The processing and display unit 15 of the vision device 2 indicates to the user 5 the test zones of the object to be tested 19 by the display in augmented reality of the visual markers and of the associated maximum tracer gas concentration thresholds on the viewing surface 23 (FIG. 6).

The user offers up the probe 4 to a test zone.

The processing and display unit 15 recognizes the end-fitting of the probe 4 in the viewing surface 23 and detects when the end-fitting of the probe 4 has reached a test zone. It informs the user 5 of the correct positioning of the probe 4, for example by a sound signal.

The sniffer probe 4 linked to the leak detector 3 sucks in the gases surrounding the object to be tested 19 in the test zone. A portion of the gases thus taken off, possibly containing the tracer gas revealing a leak, is then analyzed by the gas analyzer 8 which supplies a measurement of the tracer gas concentration to the control unit 21 of the leak detector 3. The control unit 21 sends this information, processed or not, to the processing and display unit 15.

Figure 7:
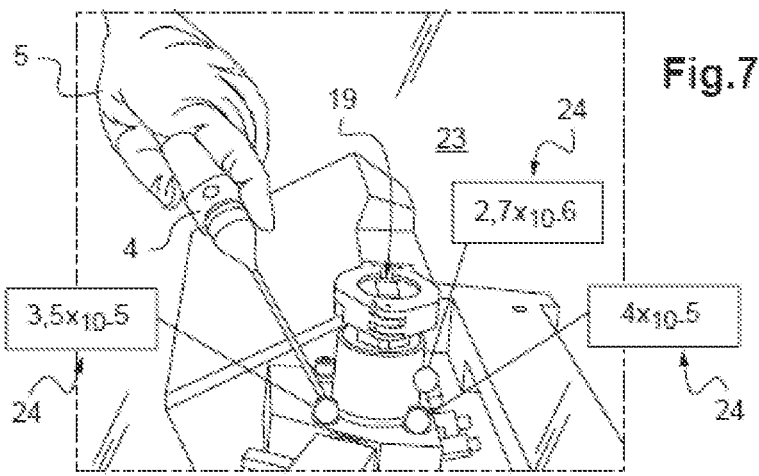
FIG. 7 shows another example of what can be seen by the user wearing the vision device of FIG. 5.

The processing and display unit 15 displays the information 24 in augmented reality, for example in the form of a numeric value, on the viewing surface 23 (FIG. 7).

The information 24 is thus displayed in real time in the field of view of the user 5. The user 5 thus has access to the measurement without needing to divert the gaze from the test zone and without having to hold a remote screen.

Once the measurement has been carried out, for example after a predefined time has elapsed in the test zone or after the activation of a switch by the user 5, it can be indicated that the test zone has been tested by the probe 4. For that, the signal representative of the tracer gas concentration can be displayed in green or in red depending on the result of the measurement.

The user 5 can then go on to the next test zone, and so on, until all the test zones are tested, that is to say, for example, all are associated with the display in augmented reality of a signal representative of the measured tracer gas concentration.

Figure 8:
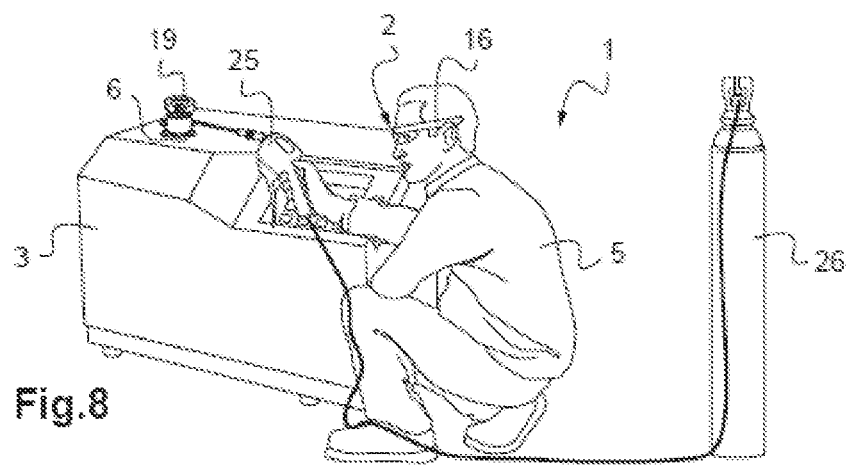
FIG. 8 shows a schematic view of a user using a leak detection module for checking the seal-tightness of an object to be tested by spraying tracer gas.

FIG. 8 shows an exemplary embodiment of a check on the seal-tightness of an object to be tested by spraying.

In this example, the probe 25 is a spray gun linked to a tracer gas source 26 so as to blow tracer gas around the objet to be tested 19 coupled to the detection input 6 of the leak detector 3.

In operation, as previously, the user 5 places the vision device 2 on his or her head to see in front of him or her through the viewing surface 17, 23 then positioned in his or her field of view.

According to an exemplary operation, the recognition means of the processing and display unit 15 of the vision device 2 recognizes the previously stored object to be tested 19. The processing unit 15 then indicates, for example to the user 5, the predetermined test zones of the object to be tested 19 by the display in augmented reality of the visual markers and of the associated maximum tracer gas concentration thresholds on the viewing surface 17, 23.

The user offers up the probe 25 to a test zone. The recognition means of the processing and display unit 15 can recognize the end-fitting of the probe 25 and detect when the end-fitting of the probe 25 is situated in a test zone of the object to be tested 19. It informs the user 5 of the correct positioning of the probe 25 for example by a sound signal.

The user sprays tracer gas around the object to be tested. A portion of the gases taken off by the pumping device 7 of the leak detector 3, possibly containing the tracer gas revealing a leak, is then analyzed by the gas analyzer 8 which supplies a measurement of the tracer gas concentration to the control unit 21 of the leak detector 3. The control unit 21 sends this information to the processing and display unit 15. The processing and display unit 15 displays this information 18, 24 for example in the form of a numeric value, on the viewing surface 17, 23.

Figure 9:
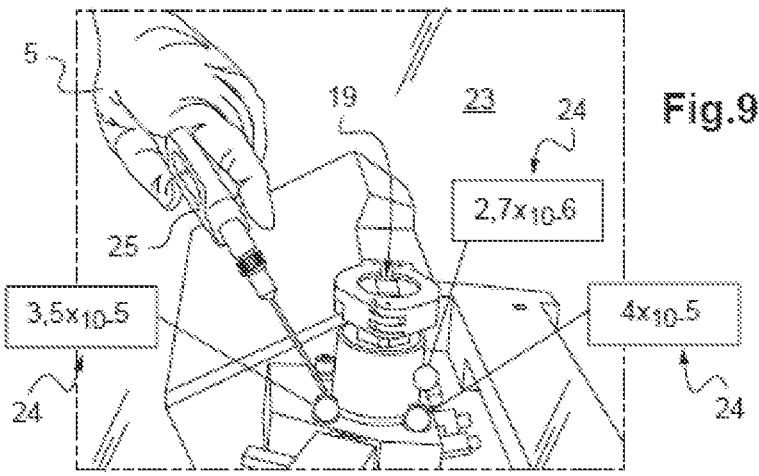
FIG. 9 shows an example of what can be seen by the user during a seal-tightness check by spraying tracer gas.

The information associated with the detection of leaks is thus displayed in real time in the field of view of the user 5 (FIG. 9). The user 5 thus has access to the measurement without needing to divert the gaze from the test zone and without having to hold a remote screen.

Once the measurement has been carried out, for example after a predefined time has elapsed in the test zone, the information 18, 24 indicates that the test zone has been tested for example by displaying the signal representative of the tracer gas concentration in augmented reality in the test zone.

The user 5 can then go on to the next test zone, and so on, until all the test zones are tested, that is to say, for example, are all associated with the display in augmented reality of a signal representative of the measured tracer gas concentration.

The invention claimed is:

1. A leak detection module for checking the seal-tightness of an object to be tested by tracer gas, comprising:
   a leak detector and a probe configured to be manipulated by a user; and
   a vision device comprising:
   a processing and display unit configured to communicate with the leak detector,
   a securing means configured to secure the vision device on a head of the user, and
   a viewing surface fixed to the securing means and configured to be placed in a field of view of the user, the processing and display unit being further configured to display, on the viewing surface, information relating to detection of leaks comprising at least one signal representative of a concentration of tracer gas measured by the leak detector.

2. The leak detection module according to claim 1, wherein the vision device further comprises at least one front-mounted camera configured to take images in the field of view of the user.

3. The leak detection module according to claim 1, wherein the viewing surface comprises a screen configured to display images in a portion of the field of view of the user.

4. The leak detection module according to claim 1, wherein the viewing surface is formed by a transparent surface allowing the user to see through, the processing and display unit being further configured to display, in augmented reality on the viewing surface, at least one item of information relating to the detection of leaks.

5. The leak detection module according to claim 1, wherein the processing and display unit comprises a recognition means configured to recognize at least one test zone of the object to be tested and to display, on the viewing surface, a visual marker of the at least one test zone.

6. The leak detection module according to claim 5, wherein the recognition means is configured to recognize an end-fitting of the probe in the viewing surface and to detect when the end-fitting of the probe is situated in the at least one test zone of the object to be tested.

7. The leak detection module according to claim 1, wherein the probe is a sniffer probe linked to the leak detector.

8. The leak detection module according to claim 1, wherein the probe is a spray gun configured to be linked to a tracer gas source.

9. A method for checking the seal-tightness of an object to be tested by tracer gas, wherein a vision device of a leak detection module according to claim 1 displays information relating to the detection of leaks comprising at least one signal representative of a concentration of tracer gas measured by the leak detector on a viewing surface placed in a field of view of a user by a vision device worn on a head of the user.

10. The method for checking seal-tightness according to claim 1, wherein the at least one signal is displayed in a form of a numeric value, of bar graphs, or in a form of a graph.

11. The method for checking seal-tightness according to claim 9, wherein the information displayed indicates whether the at least one signal exceeds a maximum tracer gas concentration threshold.

12. The method for checking seal-tightness according to claim 9, wherein the information displayed comprises a signal representative of a state of operation of the leak detector, including a state of alert, or of measurement in progress, or a fault, or maintenance to be performed, or a usage recommendation, or a combination thereof.

13. The method for checking seal-tightness according to claim 9, wherein at least one predetermined test zone of the object to be tested is recognized and the at least one predetermined test zone is indicated by displaying, in augmented reality, a visual marker on the viewing surface.

14. The method for checking seal-tightness according to claim 13, wherein the visual marker is accompanied by a display of at least one maximum tracer gas concentration threshold associated with the at least one predetermined test zone of the object to be tested.

15. The method for checking seal-tightness according to claim 9, wherein there is a detection of when an end-fitting of the probe is situated in a test zone of the object to be tested.

16. The method for checking seal-tightness according to claim 9, wherein at least one test zone tested by the probe is indicated.

17. The method for checking seal-tightness according to claim 9, wherein a sequence of measurement operations performed by the user on the object to be tested is filmed, or one or more photos are taken of the probe positioned in at least one test zone of the object to be tested.

* * * * *